(12) United States Patent
Holzwarth

(10) Patent No.: US 6,341,634 B1
(45) Date of Patent: Jan. 29, 2002

(54) ANTI-SKID CHAIN

(75) Inventor: Dietmar Holzwarth, Schwäbisch Gmünd (DE)

(73) Assignee: RUD-Kettenfabrik Rieger & Dietz GmbH u. Co., Aalen (DE)

( * ) Notice: Subject to any disclaimer, the term of this patent is extended or adjusted under 35 U.S.C. 154(b) by 0 days.

(21) Appl. No.: 09/341,612

(22) PCT Filed: Jan. 16, 1998

(86) PCT No.: PCT/DE98/00189

§ 371 Date: Jul. 13, 1999

§ 102(e) Date: Jul. 13, 1999

(87) PCT Pub. No.: WO98/31556

PCT Pub. Date: Jul. 23, 1998

(30) Foreign Application Priority Data

Jan. 17, 1977 (DE) .......................... 197 02 815

(51) Int. Cl.[7] .......................... B60C 11/00; B60C 27/00
(52) U.S. Cl. .......................... 152/217; 152/219; 152/233
(58) Field of Search .......................... 152/213 A, 213 R, 152/216, 217 I, 218, 219, 233, 231

(56) References Cited

U.S. PATENT DOCUMENTS

| | | | |
|---|---|---|---|
| 1,248,212 A | * 11/1917 | Walden | 152/213 R |
| 1,473,797 A | * 11/1923 | Servis et al. | 152/217 |
| 1,786,229 A | 12/1930 | Conrow | |
| 2,188,120 A | * 1/1940 | Smith | 152/217 |
| 2,396,532 A | * 3/1946 | Roff | 152/213 R |
| 2,460,023 A | * 1/1949 | McGuiness | 152/216 |
| 2,537,392 A | * 1/1951 | Bettcher | 152/213 R |
| 2,574,327 A | * 11/1951 | Grady et al. | 152/217 |
| 2,925,113 A | 2/1960 | Kennard | |
| 2,976,902 A | * 3/1961 | Pierre | 152/217 |
| 3,945,162 A | * 3/1976 | Martinez et al. | 152/213 R |
| 4,308,906 A | * 1/1982 | Bula et al. | 152/213 R |
| 4,376,457 A | * 3/1983 | Guenther | 152/213 R |
| 4,416,319 A | * 11/1983 | Hofmann | 152/217 |
| 4,730,665 A | * 3/1988 | Yang | 152/213 A |
| 5,033,522 A | * 7/1991 | Metraux | 152/213 A |
| 5,056,206 A | * 10/1991 | Poulsen | 152/231 |
| 6,089,291 A | * 7/2000 | Romolo et al. | 152/231 |

FOREIGN PATENT DOCUMENTS

| | | | | |
|---|---|---|---|---|
| CH | 664738 | * | 3/1988 | 152/231 |
| DE | 2620525 | * | 3/1977 | 152/231 |
| DE | 0048032 | * | 3/1982 | 152/231 |
| DE | 3227872 | | 1/1984 | |
| DE | 004225802 | * | 2/1994 | 301/37.1 |

* cited by examiner

Primary Examiner—S. Joseph Morano
Assistant Examiner—Jason R. Bellinger
(74) Attorney, Agent, or Firm—Mark P. Stone

(57) ABSTRACT

The invention relates to an anti-skid chain with a travelling net, held by an inner and outer holding device. The outer holding device is designed as a flat disk (8), at least in the area of the tire flank. Furthermore, the outer holding device has means for accomodating a tension rod (3) for the inner holding device outside the wheel flanks.

20 Claims, 4 Drawing Sheets

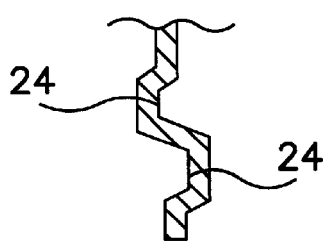
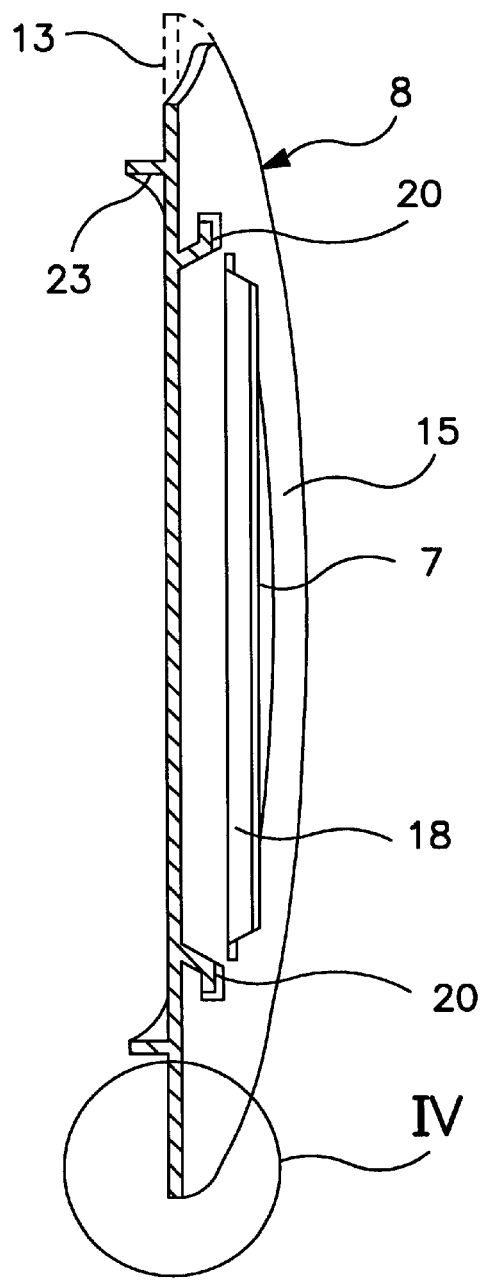
FIG. 4
FIG. 3

ANTI-SKID CHAIN

FIELD OF THE INVENTION

The invention relates to a snow chain having a running net held by an inner and an outer mounting, each arranged in the region of the tire flanks, in which the circumference of the inner mounting can be shortened by a tensioning strand guided over the tread of the tire.

STATE OF THE ART

A snow chain of the above type is known from EP 0 263 778 B1, whose inner mounting is expediently formed by a sprung steel hoop whose ends are connected to each other via a tensioning strand which is guided over the tread of the tire to the outer mounting in order to be secured there. The length of the end of the tensioning strand to be secured depends on the distance between the ends of the inner mounting bridged by the tensioning strand and the guiding of the tensioning strand at the bridging point; it may assume substantial values and result in problems with the accommodation of the end of the tensioning strand on the outside of the tire. Problems must be expected, in particular, when fitting snow chains on so-called fat tires, the more so since these, in modern vehicles, are increasingly accommodated in narrow wheel arches. In cases of the latter type, even a single threading eye for a tensioning strand arranged in the region of the tire flank may result in bodywork damage.

As is known from DE 42 25 802 A1, attempts have been made to counter the difficulties described by moving the tensioning strand, passed through a threading eye integrated into the outer mounting formed by a side chain, and guide eyes serving for its additional guidance and fixed to the side chain, into the wheel rim region, in other words towards the axle. This solution, however, makes it necessary to use a rim protector, formed by a disc which is provided with hoop-shaped connecting members into which the side forming the outer mounting must be suspended. Although the rim protector arranged between the side chain and the tensioning strand on one side and the tire flank and the rim on the other side prevents damage to the vehicle rims caused by the tensioning strand secured outside the region of the tire flanks, at the same time it too takes up more space than is desirable, not least because of the connecting members enclosing the side chain.

DESCRIPTION OF THE INVENTION

The object of the invention is to provide a snow chain of the type under consideration which eliminates the problems indicated above by virtue of a new design of the outer mounting and of the tensioning strand guide. This object is achieved, according to the invention, in that the outer mounting is designed as a flat disc, at least in the region of the tire flank, and in that it possesses means outside the region of the tire flank for securing the end of the tensioning strand.

The space taken up by the chain according to the invention between the tire flank and the wheel arch inner wall is exceptionally small. In addition to the advantage of the low space requirement of the snow chain according to the invention, a beneficial effect also results from the fact that the chain net is pre-configured by the outer mounting in a way which facilitates the assembly. Finally, it proves expedient that a special rim protector can also be dispensed with.

Further details and features are apparent from the subclaims and the description which follows of two embodiments of the invention.

BRIEF DESCRIPTION OF THE DRAWINGS

In the drawing:

FIG. 3 shows a section along the line III—III in FIG. 2, FIG. 4 shows a modification of the region indicated by IV in FIG. 3.

WAYS OF EMBODYING THE INVENTION

Figure 1:
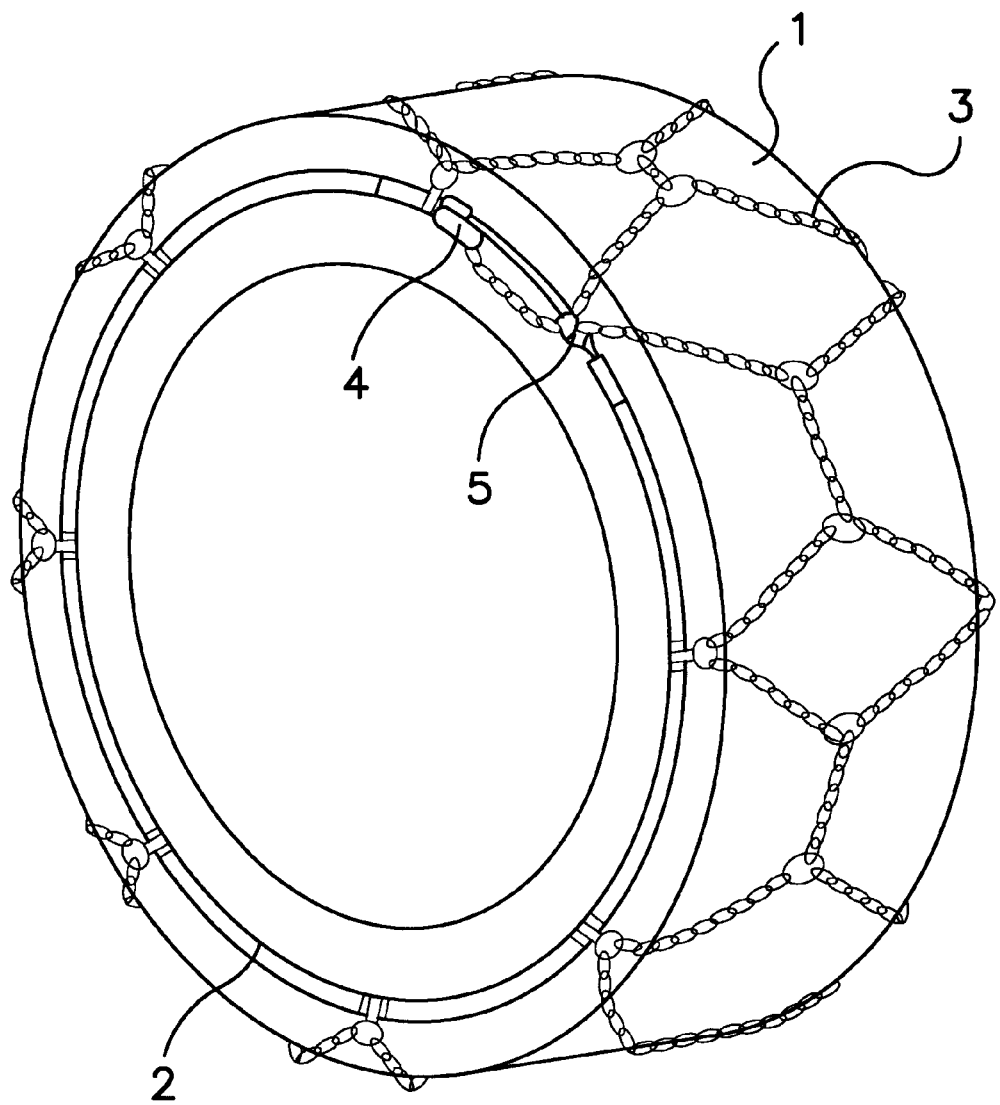
FIG. 1 shows the rear view of a snow chain having an inner mounting formed from a sprung steel together with a partial view of the running net of the chain.
Figure 2:
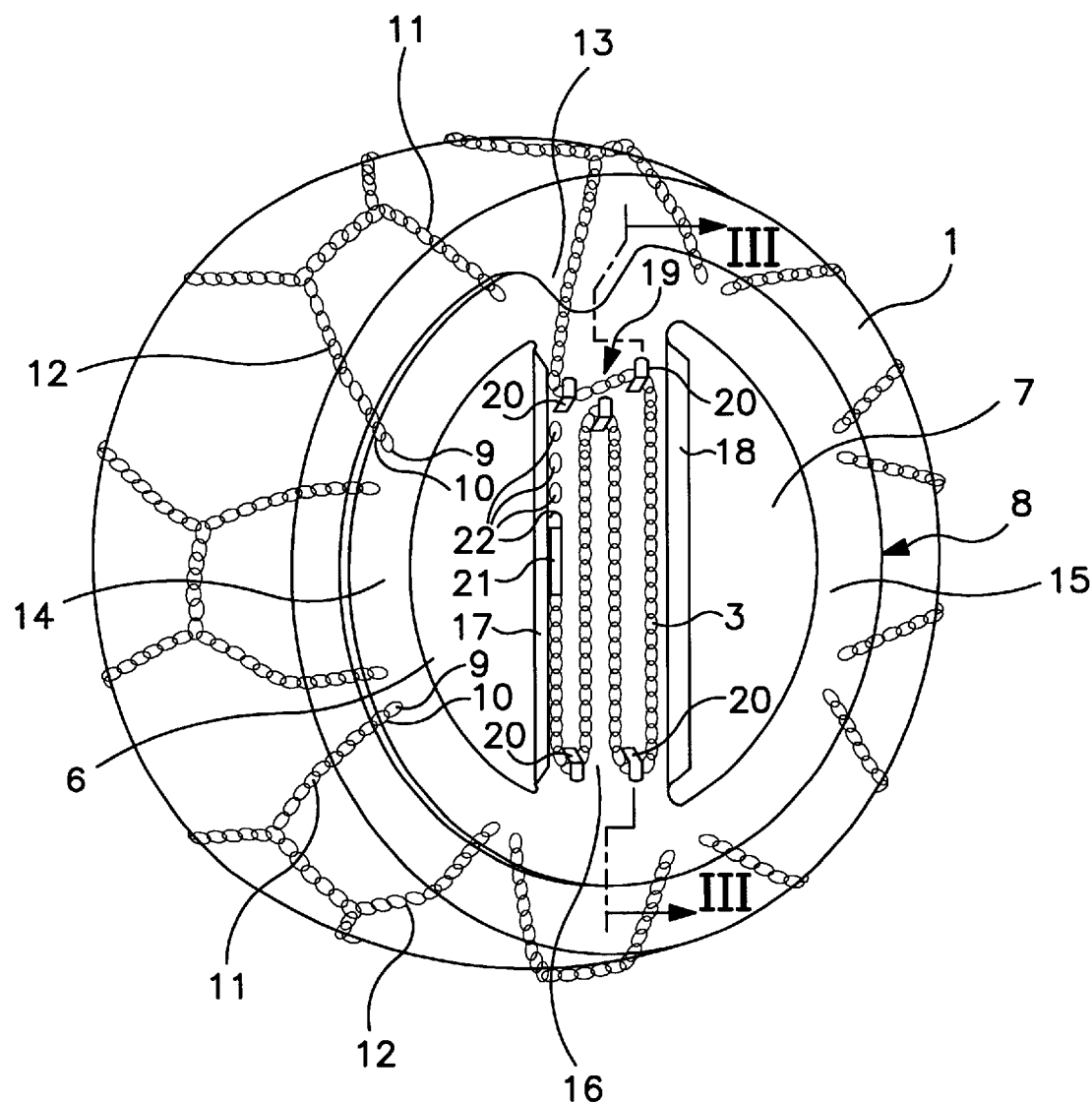
FIG. 2 shows the front view of the snow chain according to FIG. 1 with an inner mounting formed by an annular disc and a crosspiece to secure a tensioning strand.

In the figures, 1 is a so-called fat tire, in other words a t;re that takes up a great deal of space and in many cases excludes the use of snow chains, parts of which project well beyond the tire flanks. The inner mounting 2 of the snow chain fitted on the tire 1 is formed by a sprung steel hoop which makes the fitting of the chain exceptionally easy. In order to enable the sprung steel hoop to be inverted over the tire 1, it has to be spread open. The distance between the ends 4, 5 of the sprung steel hoop, bridged by a tensioning strand 3 guided in the manner of a block and tackle, assumes substantial values here, so that there is no avoiding the use of comparatively long tensioning strands 3. The problem arising from the circumstances indicated lies in the fact that, after fitting is complete and the tensioning strand 3 has been drawn tight, its excess length, which is situated at the front of the tire, has to be secured. In practice, this is customarily done in known snow chains by wrapping the end of the tensioning strand several times around the outer mounting, usually formed by a side chain, and then eventually suspending a hook arranged on the end of the tensioning strand in a member of the outer mounting. It is understood that the wrapping of a tensioning strand around a side chain situated in the region of the tire flank undesirably increases the overall width of the snow chain and of the tire, which is wide in any case. As is apparent from FIG. 2, the problem described can be solved in that the end of the tensioning strand to be secured is accommodated outside the flank region, dispensing with a deflection of the tensioning strand in the region of the front tire flank. To this end, the outer mounting consists of a flat disc 8 provided with recesses 6, 7. The disc 8 has holes 9 distributed over its circumference, into which the end links 10 of chain strand sections 11, 12 can be suspended, resilient connecting elements also being suitable as end links. In the region where the tensioning strand 3 enters the central region of the disc 8, the latter is provided with a cutout 13, in order to prevent the tensioning strand 3 from projecting further above the tire flank than the end links 10 of the chain strand sections 11, 12. The ring formed by the sections 14, 15 of the disc 4 is bridged by a crosspiece 16, which receives the chain strand end to be secured. The crosspiece 16, having lateral webs 17, 18, is provided with an anti-return device 19 with a plurality of deflection elements 20 for the tensioning strand 3. A hook 21 arranged at the end of the tensioning strand 3 may be suspended in one of a plurality of recesses 22.

It can be seen from the section shown in FIG. 3 that the disc 8 is provided with an annular collar 23 projecting, for its positional adjustment, within the rim bowl of the wheel and simultaneously serving to increase the rigidity of the disc 8, preferably manufactured from plastic. To increase the rigidity of the disc, the latter—as indicated in FIG. 4—can also be provided with beads 24.

Figure 5:
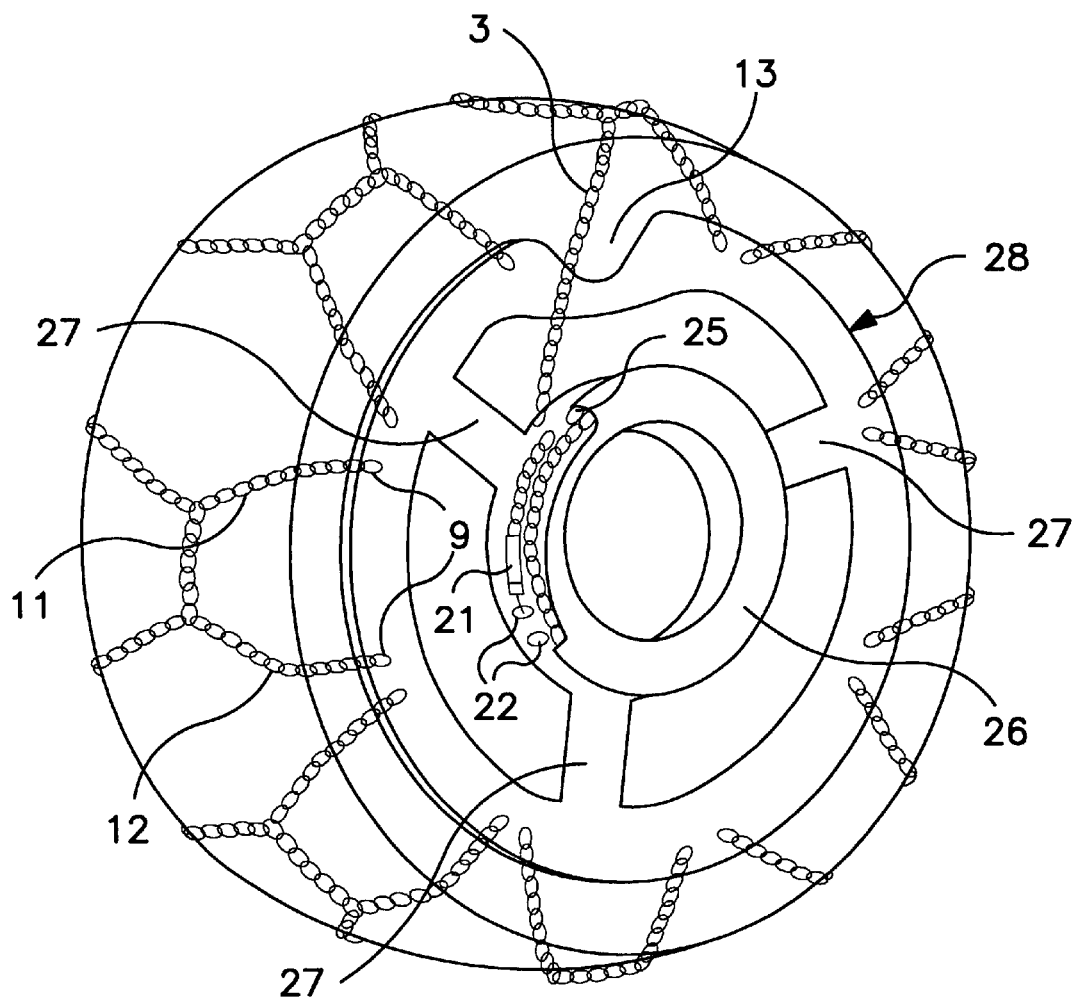
FIG. 5 shows the front view of a modified snow chain with a back corresponding to FIG. 1.

Instead of a crosspiece 16, it is also possible to use a reel 26 provided with a circumferential groove 25 to secure the end of the tensioning strand 3—as is shown in FIG. 5—the reel being connected via spoke-like, flat webs 27 to the sections of a modified disc 28 which form a ring and being designed to be either fixed or rotatable.

In both cases described, the discs 8 and 28, respectively, in addition to their function as an outer mounting and wind-up device for the end of the tensioning strand 3, also perform the function of rim protection, which is particularly desirable if light metal rims are used.

What is claimed is:

1. Snow chain having a running net held by an inner and an outer mounting, each arranged in the region of a tire flank, in which the circumference of the inner mounting can be shortened by a tensioning strand (3) guided over tread of a tire (1), characterized in that the outer mounting is designed as a flat disc (8, 28), at least in the region of the tire flank, and in that said outer mounting includes means in the region of a wheel rim for securing an end of the tensioning strand (3).

2. Snow chain according to claim 1, characterized in that the disc (8) possesses annular sections (14, 15) and a crosspiece (16), bridging the interior space of the ring formed by these sections, to secure the end of the tensioning strand (3).

3. Snow chain according to claim 2, characterized in that the side edges of the crosspiece (16) are provided with webs (17, 18).

4. Snow chain according to one or more of claims 1 to 3, characterized in that the outer mounting is provided with deflection elements (20) for the end of the tensioning strand (3) to be secured.

5. Snow chain according to claim 1, characterized in that the means for securing the tensioning strand (3) include an anti-return device (19).

6. Snow chain according to one or more of claims 1 to 5, characterized in that the outer mounting has a plurality of recesses (22) for the suspending of a hook (21) arranged on the outermost end of the tensioning strand (3).

7. Snow chain according to claim 1, characterized in that the disc (28) consists of a flat ring and a central wind-up device connected thereto for the end of the tensioning strand (3).

8. Snow chain according to claim 7, characterized in that the wind-up device possesses a circumferential groove (25) receiving the end of the tensioning strand (3) to be secured.

9. Snow chain according to one or more of claims 1 to 8, characterized in that a cutout (13) is provided on the circumference of the disc (8; 28) in the region where the end of the tensioning strand (3) to be secured enters the disc region.

10. Snow chain according to one or more of claims 1 to 9, characterized in that the disc (8) is provided with an annular collar (23) serving for its positional adjustment and extending into the rim bowl of a wheel.

11. Snow chain according to one or more of claims 1 to 10, characterized in that the outer mounting consists of plastic or sheet metal.

12. Snow chain according to one or more of claims 1 to 11, characterized in that the outer mounting forms a rim protector.

13. Snow chain according to one or more of claims 1 to 12, characterized in that the flat disc exhibits a profiled cross section.

14. Snow chain according to one or more of claims 1 to 13, characterized in that resilient connecting elements are arranged between the running net and the outer mounting.

15. Snow chain according to claim 2, characterized in that the outer mounting is provided with deflection elements (20) for the end of the tensioning strand (3) to be secured.

16. Snow chain according to claim 3, characterized in that the outer mounting is provided with deflection elements (20) for the end of the tensioning strand (3) to be secured.

17. Snow chain according to claim 2, characterized in that the means for securing the tensioning strand (3) include an anti-return device (19).

18. Snow chain according to claim 3, characterized in that the means for securing the tensioning strand (3) include an anti-return device (19).

19. Snow chain according to claim 2, characterized in that the outer mounting has a plurality of recesses (22) for the suspending of a hook (21) arranged on the outermost end of the tensioning strand (3).

20. Snow chain according to claim 3, characterized in that the outer mounting has a plurality of recesses (22) for the suspending of a hook (21) arranged on the outermost end of the tensioning strand (3).

* * * * *

UNITED STATES PATENT AND TRADEMARK OFFICE
CERTIFICATE OF CORRECTION

PATENT NO. : 6,341,634 B1
DATED : January 29, 2002
INVENTOR(S) : Dietmar Holzwarth It is certified that error appears in the above-identified patent and that said Letters Patent is hereby corrected as shown below:

<u>Column 3,</u>
Line 32, delete "one or more of claims 1 to 3", and substitute -- claim 1 --.
Line 39, delete "one or more of claims 1 to 5", and substitute -- claim 1 --.

<u>Column 4,</u>
Line 4, delete "one or more of claims 1 to 8", and substitute -- claim 1 --.
Lines 9-10, delete "one or more of claims 1 to 9", and substitute -- claim 1 --.
Lines 13-14, delete "one or more of claims 1 to 10", and substitute -- claim 1 --.
Lines 16-17, delete "one or more of claims 1 to 11", and substitute -- claim 1 --.
Lines 19-20, delete "one or more of claims 1 to 12", and substitute -- claim 1 --.
Lines 22-23, delete "one or more of claims 1 to 13", and substitute -- claim 1 --.

Signed and Sealed this

Eighteenth Day of June, 2002

*Attest:*

*Attesting Officer*

JAMES E. ROGAN
*Director of the United States Patent and Trademark Office*